(No Model.)
F. K. HESSE.
ANGLE ATTACHMENT FOR DENTAL HANDPIECES.
No. 514,073. Patented Feb. 6, 1894.
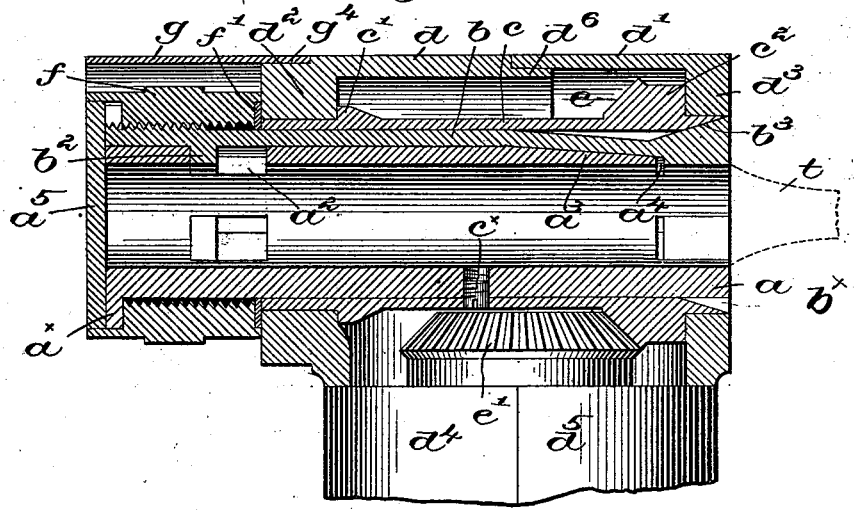
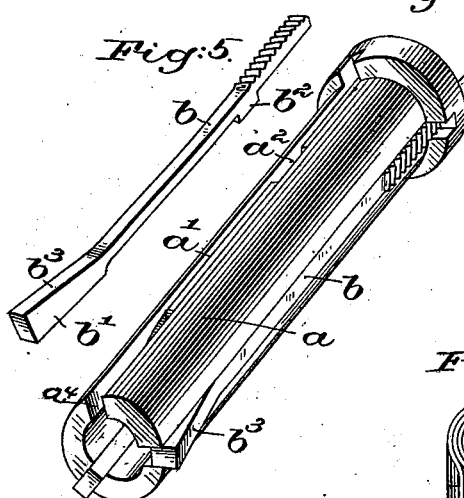
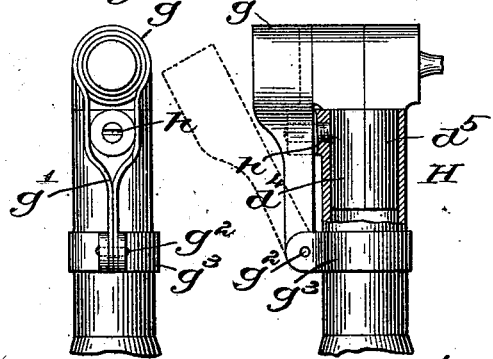
Witnesses.
Fred S. Greenleaf.
Louis N. Gowell
Inventor.
Frank K. Hesse.
By Crosby Gregory, attys.

UNITED STATES PATENT OFFICE.

FRANK K. HESSE, OF BOSTON, MASSACHUSETTS, ASSIGNOR TO CODMAN & SHURTLEFF, OF SAME PLACE.

ANGLE ATTACHMENT FOR DENTAL HANDPIECES.

SPECIFICATION forming part of Letters Patent No. 514,073, dated February 6, 1894.

Application filed November 2, 1892. Serial No. 450,734. (No model.)

*To all whom it may concern:*

Be it known that I, FRANK K. HESSE, of Boston, county of Suffolk, State of Massachusetts, have invented an Improvement in Angle Attachments for Dental Engines, of which the following description, in connection with the accompanying drawings, is a specification, like letters on the drawings representing like parts.

This invention has for its object to provide an improved angle attachment for dental engines.

Figure 1, of the drawings represents an enlarged vertical section of an angle attachment embodying my invention; Fig. 2, a side elevation of the attachment shown in Fig. 1, on a smaller scale, the attachment being shown as held by a hand piece partially broken away; Fig. 3, a left-hand side view of Fig. 2. Fig. 4, in perspective represents the tubular holder which constitutes a support for the clutch members; Fig. 5, one of the clutch members by itself; and Fig. 6, a perspective detail of the sleeve which incloses the tool clutch.

Referring to the drawings $a$ is a tubular holder constituting a socket adapted to receive within it a tool represented by dotted lines Fig. 1, the said holder at its periphery being provided with two or more grooves $a'$, preferably three in number, and extending, as shown, throughout the entire length of the holder, said grooves being cut entirely through the holder to form openings or slots at $a^2$ and near the outer end of the holder the bottoms of the grooves are made tapering or thinner, as shown at $a^3$ Fig. 1, and terminate at a short distance from the end of the holder to leave openings or slots $a^4$, for a purpose to be described. The grooves $a'$ receive the longitudinally movable clutch members $b$ provided at one of the side ends with preferably slightly depending clutch faces $b'$ which enter the openings $a^4$ in the holder, and near their opposite ends the said clutch members are provided with depending lugs $b^2$ adapted to enter and slide in the slots $a^2$ in the holder, the lugs being of less length than the slots to permit the clutch members to have longitudinal movement in their respective grooves. The holder $a$ and clutch members $b$ are contained within a tubular support shown as a sleeve $c$, shown separately in Fig. 6, which is secured to the holder by means of a screw $c^x$ or otherwise. The sleeve at its front end is beveled at its inner edge to form a deflecting wall $b^x$, for and outside of each of the longitudinally movable clutch members $b$, and to act upon the beveled outer faces $b^3$ of the said clutch members $b$ to press the members inwardly toward a common center when the members are moved longitudinally into the sleeve, and to permit the said members to expand or move away from a common center when the said members are pushed outwardly from the sleeve, the elasticity of the members tending to normally move them outwardly or to separate them. As herein shown the deflecting walls $b^x$ for the several clutch members are parts of a single annular wall in the end of the sleeve $c$. The holder and sleeve rotate in unison within an inclosing case, herein shown as composed of separable parts, two in number, lettered $d$, $d'$, the said sleeve having its bearings at its opposite ends in the inturned edges or flanges $d^2$, $d^3$, of the said parts.

The shanks $d^4$, $d^5$, of the two parts of the inclosing case are adapted to be inserted into the tubular end of a usual hand piece or holder H, Figs. 2 and 3, they being retained in place in said hand piece in suitable manner, as by a screw $h$, the joint between the two parts of the inclosing case which surrounds the rotating sleeve and clutch being made moisture tight by means of a flange $d^6$ on one of the parts which extend under the abutting edge of the other part. The sleeve $c$ is provided with two peripheral flanges $c'$, $c^2$, which present vertical faces in contact with the inner faces of the flanges $d^2$, $d^3$, of the inclosing case, which act to prevent longitudinal and wabbling movement of the sleeve in its journal bearings. A series of beveled teeth $e$ are formed upon the exterior of the sleeve $c$, said teeth, as herein shown, being cut in the peripheral flange $c^2$ and meshing with a beveled gear or pinion $e'$ journaled in the hand piece and adapted to be driven, in suitable manner by a dental engine to which the hand piece is attached, the teeth $e$ being withdrawn from mesh with the pinion $e'$ when the inclosing case with its parts is withdrawn from the hand piece.

The back end of the holder $a$, or that end opposite the openings $a^4$ is provided with an end flange $a^x$, the end of the holder being closed by an end plate $a^5$ which may be separate from the holder and attached thereto, as shown, or formed integral therewith.

Between the flange $a^x$ on the holder, and the flange $d^2$ on the inclosing case is interposed a nut $f$ internally threaded to engage the threads at the inner ends and upon the exterior faces of the longitudinally movable clutch members $b$. The holder $a$ being connected firmly to the surrounding sleeve $c$, and the latter being permanently held in its bearings in the inclosing case it will be seen that the nut $f$ cannot itself move longitudinally; therefore, any rotative movement of the nut will act upon and move the clutch members $b$ in and out of the sleeve $c$, the clutch members separating as they move out from the sleeve to thereby release a tool entered into the holder and being contracted to grip a tool when drawn into the holder. The nut $f$, the sleeve $c$, holder $a$, and clutch members $b$, all rotate in unison when the sleeve is rotated by the pinion $e'$, a thin washer $f'$ being preferably interposed between the end of the nut and the non-rotatable end of the flange $d^2$ of the inclosing case to constitute a proper bearing surface. The peripheral face of the nut is milled that it may be more firmly grasped by the fingers when the nut is to be rotated with relation to the holder $a$ to effect the clutching or releasing of the tool, and to prevent this milled edge coming in contact with the mouth of a patient when the angle attachment is in use I protect the same by means of a substantially circular protecting ring $g$ on an arm $g'$ pivoted at $g^2$ on the end of the hand piece H, the said ring and arm being herein represented as formed of a single strip of thin metal bent into the required shape. When the hand piece is in use, this ring is turned from its dotted position Fig. 2, against the inclosing case, as in Figs. 1 and 3, and preferably overlapping the end of the case, as at $g^4$, to thereby keep the rotating nut from peripheral contact with the mouth of the patient. As the end plate $a^5$ closes the end of the tubular holder $a$ and thereby excludes all moisture from the interior of the device, it is not necessary to carry the inclosing ring $g$ over and to cover the end of the nut.

An important feature of this attachment is that it is impossible to withdraw or loosen the nut $f$ or any of the clutch members $b$, for by reference to Fig. 1, it will be seen that the nut is permanently retained in position between the flanges $a^x$ and $d^2$ and cannot be removed therefrom except by separation of the holder $a$ and sleeve $c$ when the screw $c$ is removed, and the clutch members $b$ cannot be forced outwardly from the attachment for the reason that their length of movement is limited by the lugs $b^2$ moving in the slots $a^3$, which slots permit longitudinal movement of the members and check rotation of the nut when the lugs reach the ends of the slots. The vertical end bearings formed by the peripheral flanges $c'$, $c^2$, prevent any wabbling or looseness of the sleeve $c$ within the inclosing case and when the bearing surfaces become worn sufficiently to require readjustment the abutting faces of the two parts of the inclosing case may be ground off slightly to permit the ends or flanges $d^2$, $d^3$ to come nearer together and thereby take up the wear between the parts.

This invention is not restricted to the particular construction herein shown, as the same may be varied without departing from the scope of this invention.

I claim—

1. In an angle attachment for dental engines, two or more independent clutch members, a rotatable holder for the same, a rotatable support having deflecting walls to cause contraction of the clutch members when the latter are given a relative movement to said walls, and a nut to cause such relative movement, substantially as described.

2. In an angle attachment for dental engines, a holder, and two or more independent clutch members longitudinally movable in said holder, combined with a sleeve surrounding said holder and clutch members and to cause said clutch members when moved longitudinally to be closed and opened, and a nut at one end of the holder to cause longitudinal movement of the clutch members in said holder and sleeve, substantially as described.

3. In an angle attachment for dental engines, the combination with a tubular holder, provided with longitudinal grooves, of clutch members longitudinally movable in said grooves, a rotatable nut to impart a longitudinal movement to said members in said grooves, stops on the clutch members to limit the longitudinal movement of the same, and a sleeve surrounding said holder and clutch members, substantially as described.

4. In an angle attachment for dental engines, a tool clutch provided with movable clutch members, a rotatable support having deflecting walls to cause contraction of said clutch members when a relative movement is given said members and support, a nut to cause such relative movement, a support to which said nut is threaded, and stops to prevent threaded disengagement or separation of the said nut and its support, substantially as described.

5. In an angle attachment for dental engines, a tool clutch, and bevel gears to rotate the same, combined with a separable two-part inclosing case for said tool clutch, each part of said case containing a journal bearing for one of the ends of said clutch, substantially as described.

6. In an angle attachment for dental engines, a tool clutch, and bevel gears to rotate the same, combined with a separable two-part inclosing case for said tool clutch, each part of said case containing a journal bearing for one of the ends of said clutch, one of said parts overlapping the other at their line of junction to form a moisture-tight joint between the two, substantially as described.

7. In an angle attachment for dental engines, a tool clutch, a bevel gear rotatable therewith, and a bevel pinion in mesh with said bevel gear and having its axis at an angle to the axis of said gear, combined with a separable two-part inclosing case for said clutch, said inclosing case containing bearings for and in which said clutch rotates and also provided with shanks which co-operate to form a bearing for and in which the said beveled pinion rotates, substantially as described.

8. An angle attachment for dental engines containing a rotatable tool clutch provided with a tool-receiving socket open at one end to receive a tool, and closed at its opposite end to exclude moisture from said socket, and a nut applied to and to close and open said clutch to clamp and release a tool, substantially as described.

In testimony whereof I have signed my name to this specification in the presence of two subscribing witnesses.

FRANK K. HESSE.

Witnesses:
FREDERICK L. EMERY,
JOHN C. EDWARDS.